United States Patent
Tseng et al.

(10) Patent No.: US 9,391,442 B2
(45) Date of Patent: Jul. 12, 2016

(54) PROTECTION DEVICE AND METHOD FOR POWER TRANSMITTER

(71) Applicant: QUALCOMM Incorporated, San Diego, CA (US)

(72) Inventors: Ryan Tseng, San Diego, CA (US); Sreenivas Kasturi, San Diego, CA (US); Edward Kenneth Kallal, III, San Diego, CA (US); Milorad Radovic, Vista, CA (US); William H. Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 13/837,638

(22) Filed: Mar. 15, 2013

(65) Prior Publication Data

US 2014/0071571 A1  Mar. 13, 2014

Related U.S. Application Data

(60) Provisional application No. 61/698,548, filed on Sep. 7, 2012.

(51) Int. Cl.
| | |
|---|---|
| H02H 3/20 | (2006.01) |
| H02J 7/02 | (2016.01) |
| H04B 5/00 | (2006.01) |
| H02J 5/00 | (2016.01) |
| H04B 1/04 | (2006.01) |
| H04B 17/10 | (2015.01) |

(52) U.S. Cl.
CPC ........ *H02H 3/20* (2013.01); *H02J 5/005* (2013.01); *H04B 1/0466* (2013.01); *H04B 5/0037* (2013.01); *H04B 5/0093* (2013.01); *H04B 17/103* (2015.01)

(58) Field of Classification Search
None
See application file for complete search history.

(56) References Cited

U.S. PATENT DOCUMENTS

| | | |
|---|---|---|
| 2005/0235169 A1 | 10/2005 | Lou |
| 2008/0197711 A1 | 8/2008 | Kato et al. |
| 2009/0174264 A1 | 7/2009 | Onishi et al. |

(Continued)

FOREIGN PATENT DOCUMENTS

| | | |
|---|---|---|
| EP | 2388930 A2 | 11/2011 |
| WO | 2010062201 A1 | 6/2010 |
| WO | 2012169584 A1 | 12/2012 |

OTHER PUBLICATIONS

International Search Report and Written Opinion—PCT/US2013/053845—ISA/EPO—Sep. 26, 2013.

*Primary Examiner* — Jared Fureman
*Assistant Examiner* — Aqeel Bukhari
(74) *Attorney, Agent, or Firm* — Knobbe Martens Olson & Bear LLP

(57) ABSTRACT

Aspects of a protection circuit and method are disclosed. A transmit circuit generates a power transmit signal for powering the transmit antenna to generate a wireless field sufficient for wirelessly charging a device. A detection circuit senses a strength of an electromagnetic field received by the transmit antenna and further configured to generate an sense signal indicating the strength of the electromagnetic field received by the transmit antenna. A power control circuit controls a switch based at least partly on the sense signal. The power control circuit can attenuate an electrical coupling between the transmit antenna and the transmit circuit such that the received electromagnetic field is inhibited from damaging the transmit antenna or the transmit circuit.

20 Claims, 8 Drawing Sheets

(56) References Cited

U.S. PATENT DOCUMENTS

| | | |
|---|---|---|
| 2009/0284082 A1* | 11/2009 | Mohammadian ............. 307/104 |
| 2010/0022209 A1 | 1/2010 | Ng et al. |
| 2010/0237709 A1 | 9/2010 | Hall et al. |
| 2011/0106210 A1 | 5/2011 | Meskens |
| 2011/0292554 A1 | 12/2011 | Yao et al. |
| 2012/0049644 A1 | 3/2012 | Choi et al. |
| 2012/0064826 A1 | 3/2012 | Darwhekar et al. |
| 2012/0149307 A1 | 6/2012 | Terada et al. |
| 2012/0231731 A1 | 9/2012 | Kim et al. |
| 2012/0235636 A1 | 9/2012 | Partovi |
| 2012/0262002 A1* | 10/2012 | Widmer et al. ............... 307/104 |

* cited by examiner

PROTECTION DEVICE AND METHOD FOR POWER TRANSMITTER

CROSS-REFERENCE TO RELATED APPLICATIONS

The application claims the priority benefit of U.S. Provisional Application No. 61/698,548, titled "PROTECTION DEVICE AND METHOD FOR POWER TRANSMITTER," filed Sep. 7, 2012, the entirety of which is incorporated herein by reference.

FIELD

The present invention relates generally to wireless power. More specifically, the disclosure is directed to protecting a power transmitter from damage caused by a proximate second transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmission device, including an antenna, a transmit circuit configured to generate signals for the antenna, and a detection circuit configured to sense power from the antenna and to generate a signal indicating an amount of power received by the antenna. The device also includes a power control circuit configured to control power transfer between the antenna and the transmit circuit based on the generated signal.

Another aspect of the disclosure provides a method of protecting a circuit, the method including preventing power transfer between an antenna and the circuit, determining that the antenna is receiving less power than a threshold, and in response to the antenna receiving less power than the threshold, allowing power to transfer between the antenna and the circuit.

Another aspect of the disclosure provides a protection circuit, configured to protect a transmit circuit, the protection circuit including means for wirelessly transmitting power, means for generating signals for the power transmitting means, and means for sensing power from the power transmitting means and for generating a signal indicating an amount of power received by the antenna. The device also includes means for controlling power transfer between the antenna and the transmit circuit based on the antenna receiving power greater than a threshold.

Figure 1:
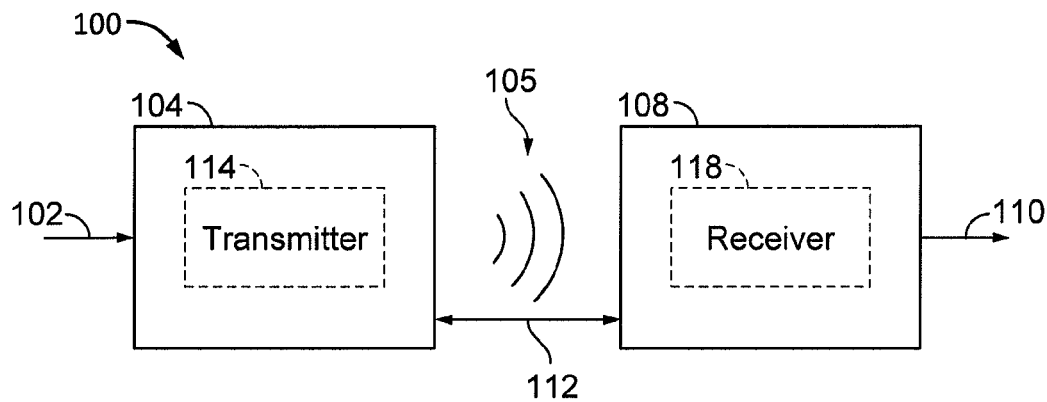
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112 and not physically in contact. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require the transmit and receive coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by wirelessly coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
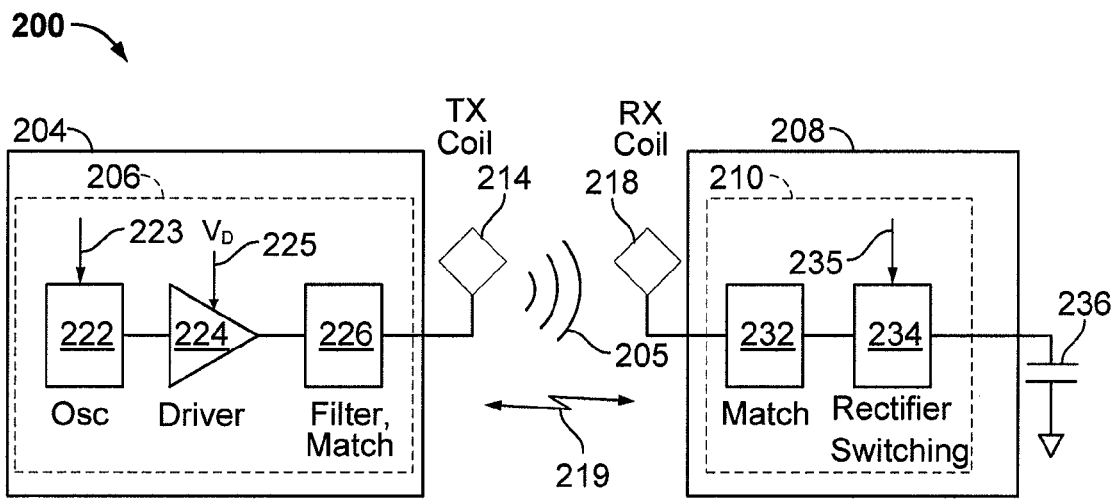
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208 may initially have an associated load (e.g., battery 236) which may be selectively connected or disconnected. In addition, receiver 208 may be configured to determine whether an amount of power transmitted by transmitter 204 and received by receiver 208 is appropriate for charging a battery 236. Further, receiver 208 may be configured to connect to and provide power to a load (e.g., battery 236) upon determining that the amount of power is appropriate. In some embodiments, a receiver 208 may be configured to provide power received from a wireless power transfer field to a load without charging a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
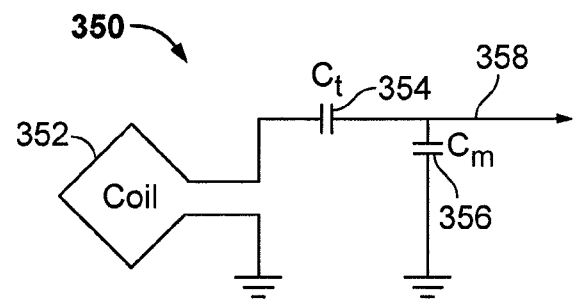
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, antenna 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
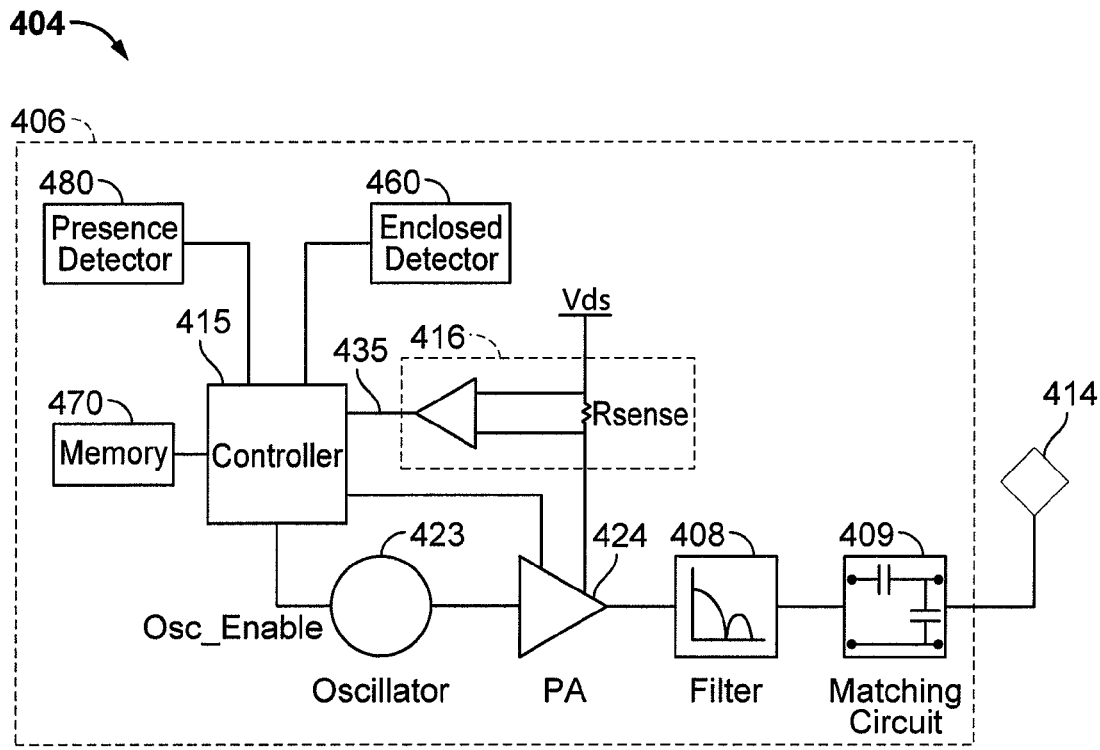
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. For example, processor 415 may be any known processor configured to execute software instructions for operating a wireless power transmitter or receiver. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are detects by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on, for example, by enabling the oscillator 423 or the driver circuit 424, and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. For example, a human may be distinguished from an object to be charged because the human may be detected by an infrared detector or a motion detector, but would not communicate with the transmitter 404. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time, for example, by disabling the oscillator 423 or the driver circuit 424. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
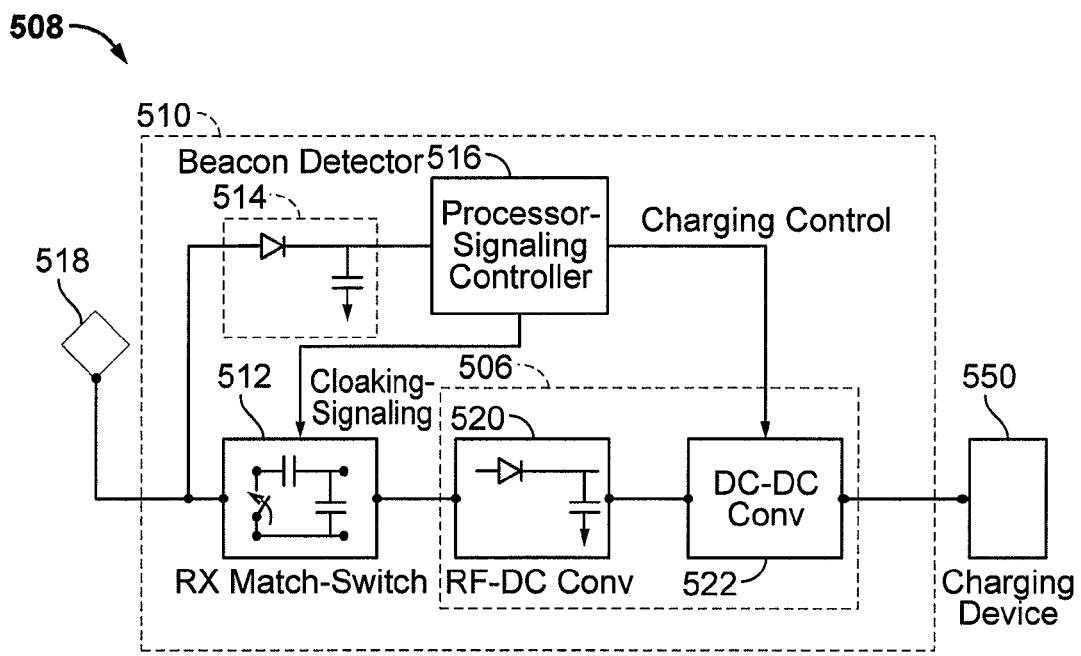
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
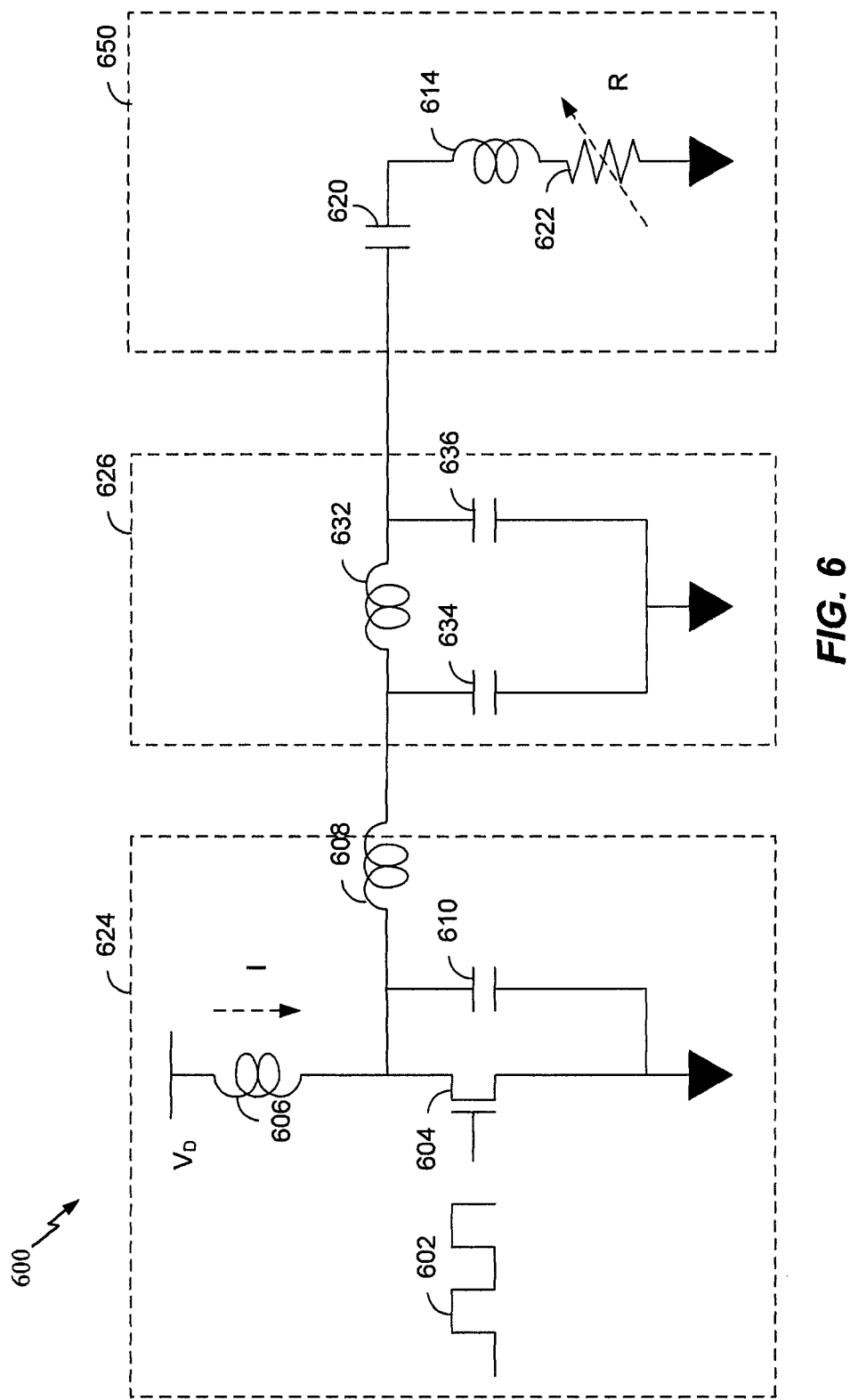
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. The driver circuit 624 may be similar to the driver circuit 424 shown in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In some circumstances, if multiple transmitters, such as those discussed above are simultaneously transmitting and are nearby one another, there may be undesirable results. For example, a first transmitter wirelessly transmitting power, may unintentionally inductively couple with a second transmitter. In a first scenario, the first transmitter's circuitry may be damaged by experiencing an unexpected loading due to the second transmitter. In other words, the first transmitter experiences the second transmitter as a large load (rather than the smaller load of a receiver circuit (e.g. FIG. 5). In a second scenario, the second transmitter's circuitry may be damaged due to unintentionally acting as a receiver circuit. In other words, when the first and transmitter become unintentionally inductively coupled, the second transmitter may be damaged by power received from the first transmitter. When a transmitter is in an off-state, damage is prevented because power received (i.e. the antenna can receive power passively without the circuit being "on") is prevented from being delivered to the sensitive circuitry of the transmitter. In addition, upon transition from the off-state to an on-state, before coupling the transmit circuitry to the antenna, a detection circuit determines that the antenna is not receiving potentially damaging power. If the antenna is receiving potentially damaging power, the transmit circuitry is not coupled to the antenna.

Figure 7:
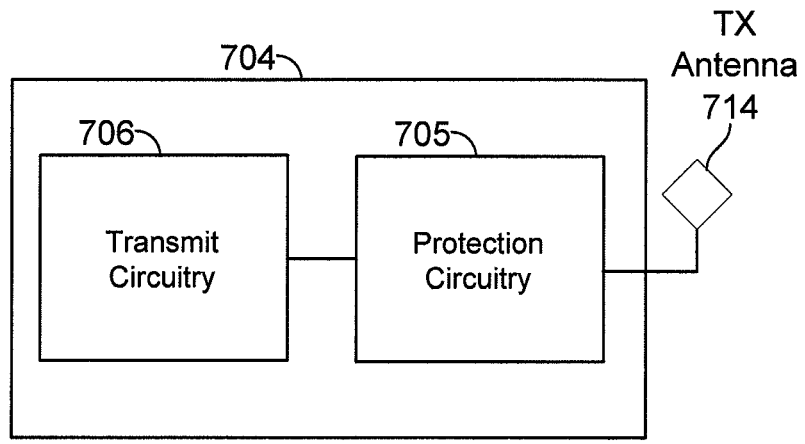
FIG. 7 is a functional block diagram of a transmitter that may be used in a wireless power transfer system such as that of FIG. 1, in accordance with exemplary embodiments of the invention.

FIG. 7 is a functional block diagram of a transmitter 704 that may be used in a wireless power transfer system such as that of FIG. 1, in accordance with exemplary embodiments of the invention. The transmitter 704 includes a transmit circuitry 706, a protection circuitry 705, and a transmit antenna 714.

The transmit circuitry 706 may be similar to transmit circuitry discussed above, such as transmit circuitry 206, 406, and 600 of FIGS. 2, 4, and 6, respectively. Transmit circuitry 706 provides a transmit power signal (e.g., an RF oscillating signal) as an output. For example, the transmit power signal can be provided to the transmit antenna 714 through the protection circuitry 705. The power transmit signal can be an oscillating signal resulting in generation of energy (e.g., electromagnetic flux) about the transmit antenna 714. Transmitter 704 may operate at any suitable frequency. By way of example, transmitter 704 may operate at the 6.78 MHz ISM band.

The transmit antenna 714 may be similar to the antennas discussed above, such as antennas 214, 352, and 414 of FIGS. 2, 3, and 4, respectively. The transmit antenna 714 can receive the power transmit signal as an input and generate a wireless field as an output. For example, the transmit antenna 714, being electrically coupled to the transmit circuitry 706, may receive the power transmit signal, which powers the transmit antenna 714 and generates a wireless field sufficient for wirelessly charging and/or powering a device. As one example, the power provided may be for example about 300 milliWatts to 5 Watts to power or charge different devices with different power requirements. Higher or lower power levels may also be provided.

The protection circuitry 705 may carry the power transmit signal between the transmit circuitry 706 and the protection circuitry 705. The protection circuitry 705 may be used to protect the transmit circuitry 706 from damage which would be caused by an electromagnetic field and/or power received by transmit antenna 714 were there no protection. For example, the protection circuitry 705 may sense a strength of an electromagnetic field and/or power received by the transmit antenna 714. Based on the sensing, the protection circuitry 705 may attenuate the electrical coupling between the transmit antenna and the transmit circuitry such that the received electromagnetic field and/or power is inhibited from damaging at the transmit circuitry 706 and/or transmit antenna 714 through the electrical coupling.

The protection circuitry 705 may attenuate the electrical coupling in various ways. In one embodiment, the protection circuitry 705 may shunt energy and/or power received by the transmit antenna 714. In some embodiments, the protection circuitry 705 connects the transmit circuitry 706 and the transmit antenna 714 with a switch, and if the switch is open energy and/or power from the transmit antenna 714 is electrically isolated from the transmit circuitry 706.

The protection circuitry 705 can provide protection when the transmit circuitry 706 is in an off-state. For example, while the transmit circuitry 706 is in the off-state, the protection circuitry 705 may attenuate an electrical coupling between the transmit antenna 714 and the transmit circuitry 706. As a result, energy and/or power transfer between the transmit antenna 714 and the transmit circuitry 706 may be inhibited or prevented.

In addition, when the transmit circuitry 706 transitions from the off-state to the on-state, before allowing power to transfer between the transmit circuitry 706 and the transmit antenna 714, the protection circuitry 705 determines whether the transmit antenna 714 is receiving a potentially damaging electromagnetic field and/or power. If the transmit antenna 714 is receiving potentially damaging power, the electrical coupling is attenuated. For example, energy and/or power is inhibited or prevented from transferring between the transmit circuitry 706 and the transmit antenna 714. If the transmit antenna 714 is not receiving potentially damaging power, power is allowed to transfer between the transmit circuitry 706 and the transmit antenna 714.

Figure 8:
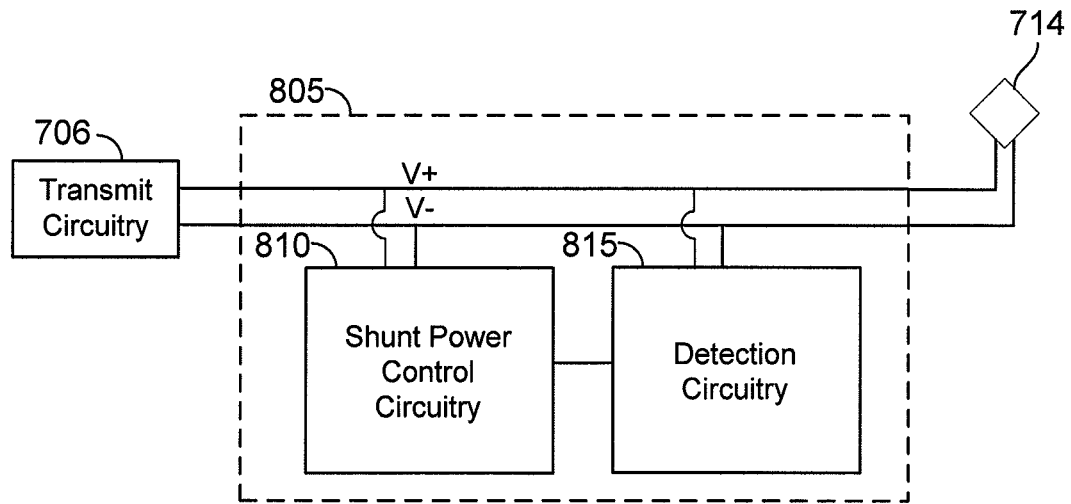
FIG. 8 is a functional block diagram of the transmit circuitry 706 of FIG. 7 and a protection circuitry that may be used in a transmitter such as the transmitter of FIG. 7, in accordance with exemplary embodiments of the invention.

FIG. 8 is a functional block diagram of the transmit circuitry 706 of FIG. 7 and a protection circuitry 805 that may be used in a transmitter, such as transmitter 704 of FIG. 7, in accordance with exemplary embodiments of the invention. The protection circuitry 805 may include a shunt power control circuitry 810 and a detection circuitry 815.

The shunt power control circuitry 810 may include a connection to the power transmit signal (e.g., V+ and V− of FIG. 8) between the transmit circuitry 706 and the transmit antenna 714, and may receive a control signal. For example, the control signal may be provided by the detection circuitry 815 based on sensing the power signal transmit signal V+, V−. Based on the control signal the shunt power control circuitry 810 activates or deactivates the connection as described in greater detail below.

The shunt power control circuit 810 may operate in an off-state and an on-state, in accordance with the control signal. In the off-state, the shunt power control circuitry 810 may activate the connection between the transmit circuitry 706 and the transmit antenna 714 such that energy and/or power received by the transmit antenna 714 is not delivered to the transmit circuitry, but is instead shunted. In some implementations, the energy and/or power is shunted to a ground. In some implementations, both electrodes V+, V− of a coil of the transmit antenna 714 are shorted. The shunt power control circuitry 810 shunts the transmit antenna 714 as long as the detection circuitry 815 does not provide the control signal for causing the shunt power control circuitry 810 to cease shunting the transmit antenna 714.

If the transmit circuitry 706 is in the off-state, the detection circuitry 815 is configured to provide the control signal for causing the shunt circuitry 810 to shunt signals from the transmit antenna 714. If the transmit circuitry 706 is in the on-state, the detection circuitry 815 senses a strength of an electromagnetic field and/or power received by the transmit antenna 714. If the transmit antenna 714 is receiving an electromagnetic field and/or power of sufficient strength, the detection circuitry 815 maintains the control signal for shunting so that the received energy and/or power does not damage the transmit circuitry 706. Conversely, if the transmit antenna 714 is not receiving an electromagnetic field and/or having strength or power above the threshold, the detection circuitry 815 generates the control signal for causing the shunt power control circuitry 810 to cease shunting, so that the transmit circuitry 706 may drive the transmit antenna 714. In some implementations, while the transmit circuitry 706 drives and/or powers the transmit antenna 714, the detection circuitry 815 ceases sensing.

In some embodiments, the detection circuit 815 senses the strength of the electromagnetic field and/or power received by the transmit antenna 714 by measuring an electrical characteristic generated by the transmit antenna. For example, detection circuit 815 may sense a current, voltage, impedance, or other like electrical characteristics at the transmit antenna 714. Sensing will be described in greater detail later with reference to FIGS. 10-12.

Figure 9:
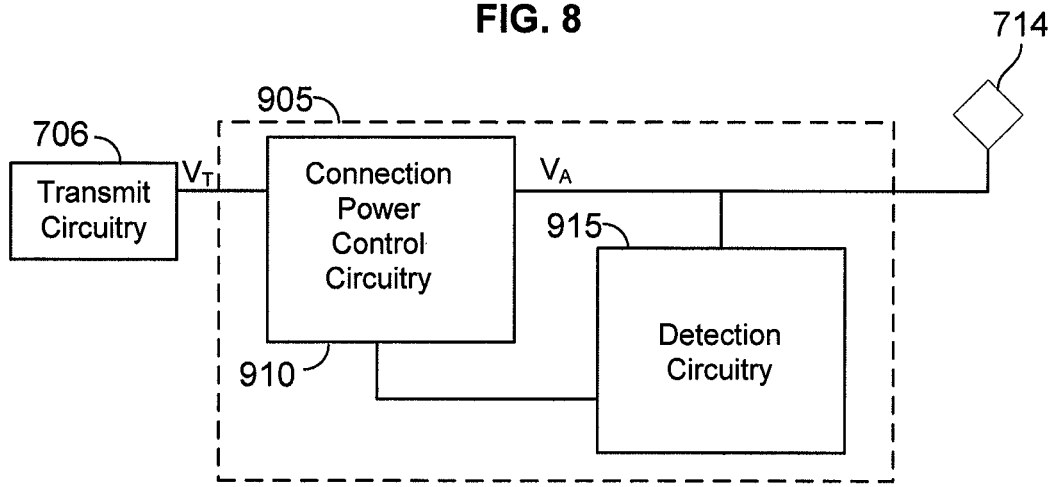
FIG. 9 is a functional block diagram of the transmit circuitry 706 of FIG. 7 and a protection circuitry that may be used in a transmitter such as the transmitter of FIG. 7, in accordance with exemplary embodiments of the invention.

FIG. 9 is a functional block diagram of the transmit circuitry 706 of FIG. 7 and of a protection circuitry 905 that may be used in a transmitter such as transmitter 704 of FIG. 7, in accordance with exemplary embodiments of the invention. The protection circuitry 905 may include a connection power control circuitry 910 and a detection circuitry 915.

The connection power control circuitry 910 may carry the power transmit signal (e.g., $V_T$ in FIG. 9) from the transmit circuitry 706 to the transmit antenna 714 (e.g., as $V_A$ in FIG. 9). The connection power control circuitry 910 may receive a control signal, for example from the detection circuitry 915, for controlling the state of the connection power control circuitry 910. In an off-state, the connection power control circuitry 910 may decouple the connection between the transmit circuitry 706 and the transmit antenna 714, such that energy and/or power received by the transmit antenna 714 is not delivered to the transmit circuitry 706. The connection power control circuitry 910 decouples the connection as long as the detection circuitry 915 does not provide the control signal for causing the connection power control circuitry 910 to couple the transmit antenna 714 and the transmit circuitry 706.

When the transmit circuitry 706 is in the off-state, the detection circuitry 915 is configured to provide the control signal to the connection power control circuitry 910 for decoupling the connection between the transmit circuitry 706 and the transmit antenna 714. When the transmit circuitry 706 is in the off-state, the detection circuitry 915 senses whether the transmit antenna 714 is receiving an electromagnetic field and/or power having a strength above a threshold. If the transmit antenna 714 is receiving sufficient energy and/or power, the detection circuitry 915 maintains the control signal for decoupling the transmit antenna 714 and the transmit circuitry 706. Doing so should inhibit the received energy and/or power from damaging the transmit circuitry 706.

If the detection circuitry 915 does not sense receiving an electromagnetic field and/or power above the threshold, the detection circuitry 915 generates the control signal for causing the connection power control circuitry 910 to couple the transmit antenna 714 and the transmit circuitry. As a result, the transmit circuitry 706 may drive the transmit antenna 714. In some implementations, when the transmit circuitry 706 drives the transmit antenna 714, the detection circuitry 915 ceases to sense the transmit antenna 714.

In some embodiments, the detection circuit 915 senses the strength of the electromagnetic field received by the transmit antenna 714 by measuring an electrical characteristic generated by the transmit antenna. For example, detection circuit 915 may sense a current, voltage, impedance, or other like electrical characteristics at the transmit antenna 714.

In connection with FIGS. 8 and 9, it will be appreciated that the control signals may be generate directly by the detection circuits 815, 915, as shown and described. I will also be appreciated that the control signals may be generated indirectly by the detection circuitry 815, 915. For example, the detection circuitry 815, 915 may sense a strength of a received electromagnet field and generate a sense signal in accordance. An external circuit (e.g., a processor or a comparator) may receive the sense signal and determine whether the sensed strength is sufficient for protective action. The external circuit may then generate the control signal based on the determination using the sense signal.

Figure 10:
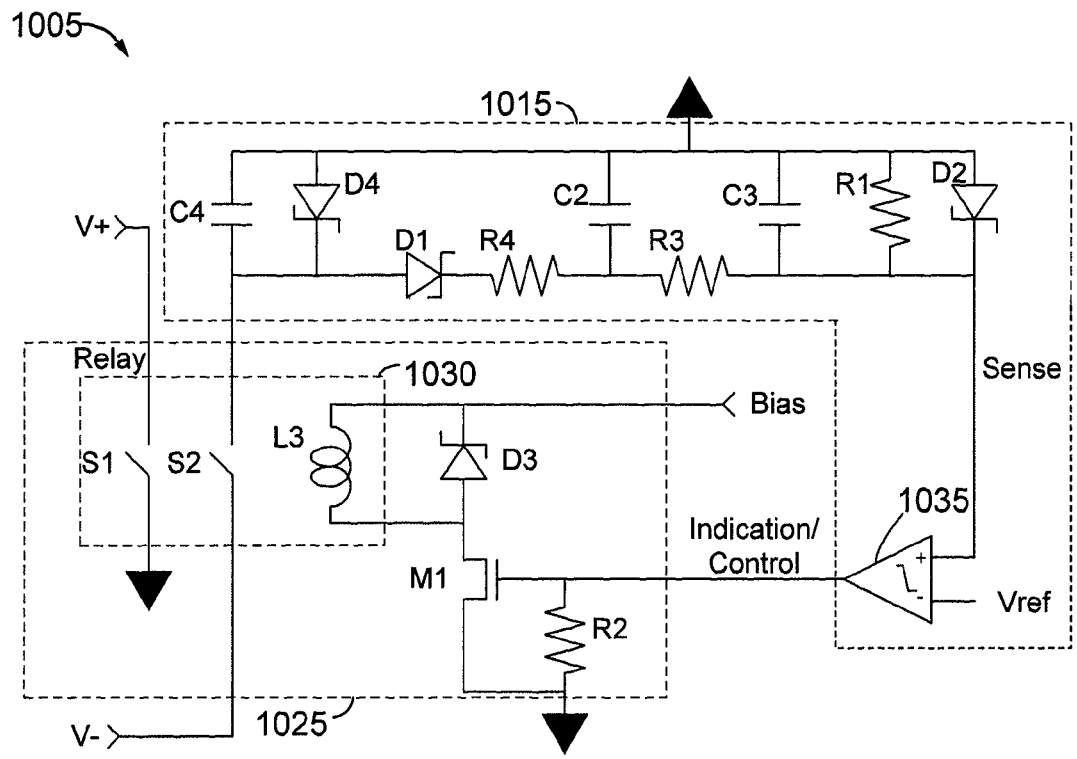
FIG. 10 is a schematic diagram of a protection circuitry that may be used in a transmitter such as the transmitter of FIG. 7, in accordance with exemplary embodiments of the invention.

FIG. 10 is a schematic diagram of a protection circuitry 1005 that may be used in a transmitter such as transmitter 704 of FIG. 7, in accordance with exemplary embodiments of the invention. For instance, the protection circuit 1005 can correspond to an embodiment of the protection circuit 805 of FIG. 8. The protection circuitry 1005 includes a power control circuit 1025 and a detection circuit 1015. The power control circuit 1025 includes a relay 1030 that comprises switches S1, S2, and S3 and an inductor L3. The power control circuit 1030 also includes a diode D3, a transistor M1, and a resistor R2. The detection circuit 1015 includes resistors R1, R3, and R4; capacitors C2, C3, and C4; and diodes D1 and D2.

The detection circuit 1015 includes a monitoring circuit, such as comparator 1035, for generating the indication/control signal based on a comparison of the sense signal with a threshold Vref. It will be appreciated that the comparator 1035 is just one example embodiment of the monitoring system. Other implementations will be readily determinable, such as using a general processor.

The power control circuit 1025 receives the control signal with a gate terminal of the transistor M1. In addition, the power control circuit 1025 can receive a bias signal with the relay 1030. The bias signal provides a bias supply for powering the inductor L3. The control signal can switch the relay 1030 on and off. For example, the transistor M1 receives the control signal and selectively turns on or off based on the control signal. When M1 is on, the inductor L3 can conduct a current supplied by the bias signal. As a result, the inductor L3 generates a magnetic field that can open the switches S1 and S2. Otherwise, the switches S1 and S2 are closed. In the illustrated embodiment, the diode D3 can prevent transient voltage spikes (for example, flyback) across the transistor M1 when the relay turns-off. In addition, the resistor R2 can pulls down the gate of the transistor M1 so that the relay stays closed, for example, at power up.

The detection circuitry 1015 receives a signal from the terminal V− of the transmit antenna (e.g., the transmit antenna 714 of FIG. 8) when the power control circuit 1025 is in an off-state, and generates the indication signal as an output. For example, in the illustrated embodiment, when the switches S1 and S2 are closed, one terminal V+ of the transmit antenna is coupled to ground and other terminal V− of the transmit antenna is coupled to the detection circuitry 1015.

The indication/control signal provides an indication of the presence of a potentially damaging electromagnetic field and/or power. In the illustrated embodiment, the detection circuit 1015 generates the indication signal based on sensing an electrical characteristic of the transmitting antenna. For example, a detectable voltage forms across capacitor C4 as a result of the electromagnetic field and/or power received by terminal V−. The diodes D4 and D1 and the capacitor C2 can rectify the voltage formed across C4. The resistor R4 can reduce electromagnetic interference. A network formed by the resistor R3 and the capacitor C3 can correspond to a low pass filter. The diode D2 can clamp the output signal voltage. The resistor R1 can discharge the capacitor C3. In the illustrated embodiment, when the transmit antenna receives an electromagnetic field and/or power, a voltage of the sense signal should increase. When the transmit antenna does not receive an electromagnetic field and/or power, the voltage of the indication signal should decrease.

The sense signal can be used to generate the indication signal. For example, a monitoring circuit can receive the sense signal and generate the indication signal as an output. In the illustrated embodiment, the comparator 1035 forms the monitoring circuit. In particular, the comparator generates the indication/control signal based on a comparison of the sense signal with a threshold Vref.

It will be appreciated that the comparator 1035 is just one example embodiment of the monitoring system. Other implementations will be readily determinable. In some embodiments, the sense signal can be provided to an external circuit (not shown), such as a processor, and the indication/control signal can be generated therefrom. If the indication signal indicates that the received strength is greater than the threshold, the processor maintains the control signal so that the power control circuit 1025 remains in an off-state (for example, the switches S1 and S2 are closed).

If it is determined that the strength of the received electromagnetic field and/or power is less than the threshold, the processor can generate the control signal to cause the transistor M1 to activate. As a result, the inductor L3 conducts current from the bias signal and the switches S1 and S2 to open. When the switches S1 and S2 are open, the transmit circuitry (for example, transmit circuitry 706 of FIG. 7) may drive the transmit antenna (for example, transmit antenna 714 of FIG. 7) and, in the illustrated embodiment, the detection circuitry 1015 no longer senses the transmit antenna 714. In some implementations, the processor can be included in the protection circuitry 1005. In some implementations, functionality of the processor can be implemented by the protection circuitry 1005 by circuits other than a processor.

Figure 11:
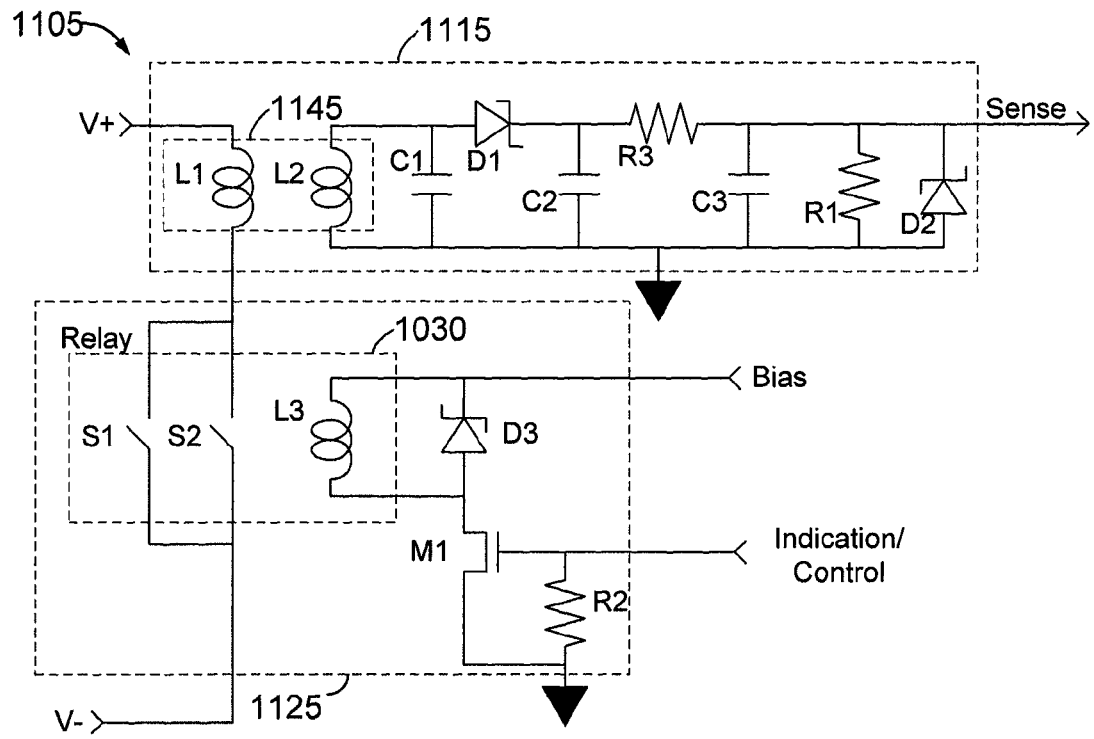
FIG. 11 is a schematic diagram of protection circuitry that may be used in a transmitter such as transmitter of FIG. 7, in accordance with exemplary embodiments of the invention.

FIG. 11 is a schematic diagram of a protection circuitry 1105 that may be used in a transmitter such as transmitter 704 of FIG. 7, in accordance with exemplary embodiments of the invention. For instance, the protection circuit 1105 can correspond to an embodiment of the protection circuit 805 of FIG. 8. The protection circuitry 1105 includes a power control circuit 1125 and a detection circuitry 1115. The power control circuit 1125 includes a diode D3, a transistor M1, and a relay 1130. The relay 1130 includes switches S1 and S2 and an inductor L3. The detection circuit 1115 includes a sensing element 1145; resistors R1 and R3; capacitors C1, C2, and C3; and diodes D1 and D2. The sensing element includes inductors L1 and L2 for forming a transformer.

The power control circuit 1125 is operatively coupled to the terminals V+ and V− of the transmit antenna. The power control circuit 1125 receives a control signal with a gate terminal of the transistor M1. In addition, the power control circuit 1125 can receive a bias signal with the relay 1130. The relay 1130 is normally closed. That is, the switches S1 and S2 are closed when the inductor L3 is not conducting current and generating a magnetic field, and are open when the inductor L3 is conducting current and generating a magnetic field. When the switches S1 and S2 are closed, they create a shunt across the terminals of the transmit antenna. The network formed by the inductor L3, the diode D3, and the resistor R2 operates similarly as in the power control circuit 1025 of FIG. 10. Accordingly, when the control signal activates the transistor M1, the switches S1 and S2 open and decouple the terminals V+ and V1.

In some embodiments, the primary inductor L1 can correspond to the transmit antenna of the transmitter. In one embodiment, the switch S1 need not be included.

The detection circuitry 1115 receives signals from the terminals V+ and V− of the transmit antenna (e.g., the transmit antenna 714 of FIG. 7), and generates the sense signal as an output. For example, in the illustrated embodiment, when the switches S1 and S2 are closed, the terminal V+ and V− are coupled by the primary inductor L1 of the transformer 1145. As a result, signals passing through the primary inductor L1 generate signals through the secondary inductor L2 for generating the sense signal. In the illustrated embodiment, the capacitor C1 shunts the secondary inductor L2 of the transformer. The diode D1 and the capacitor C2 rectify the voltage formed across C1. The resistor R3 and the capacitor C3 form a low pass filter. The diode D2 clamps the indication signal, and R1 discharges the capacitor C3. Once the transmit antenna stops receiving power, the voltage of the indication signal voltage should drop.

In some embodiments, the sense signal can be provided to an external circuit (not shown), such as a processor. Additionally or alternately, the external circuit can generate the control signal. For instance, the external circuit can correspond to a similar external circuit as described in connection with FIG. 11.

Figure 12:
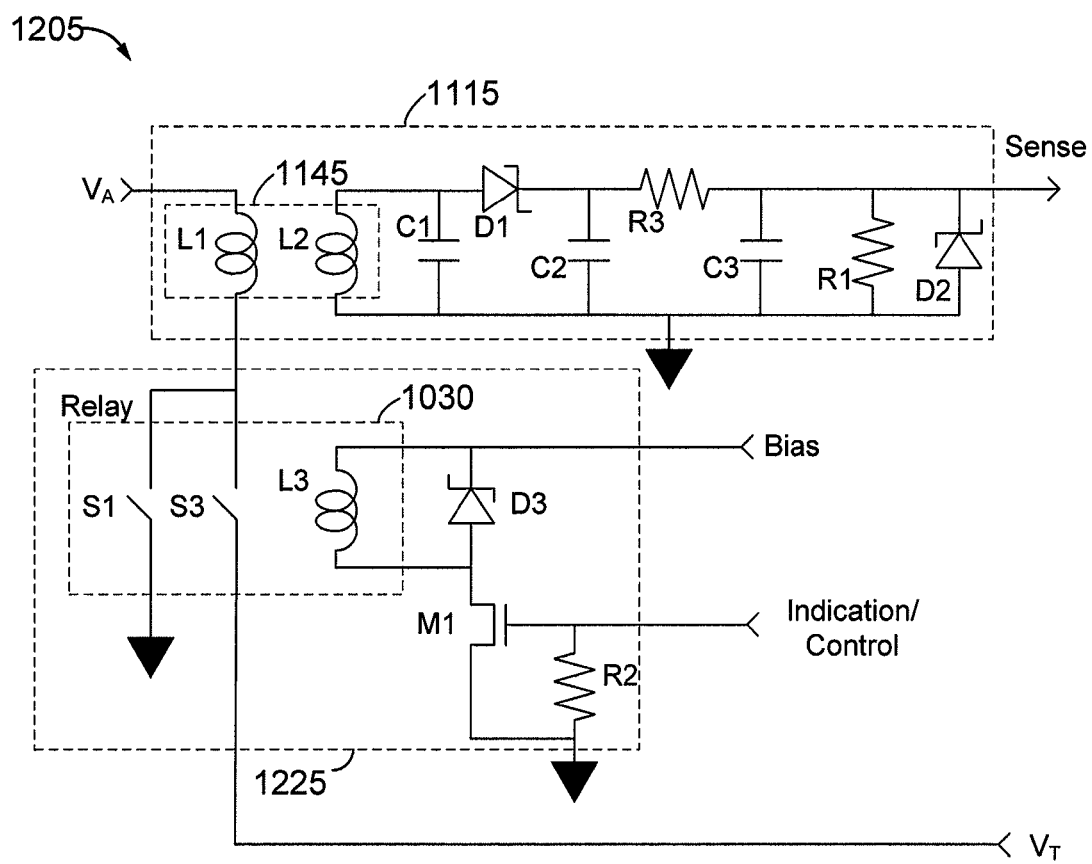
FIG. 12 is a schematic diagram of protection circuitry that may be used in a transmitter such as the transmitter of FIG. 7, in accordance with exemplary embodiments of the invention.

FIG. 12 is a schematic diagram of a protection circuitry 1205 that may be used in a transmitter such as transmitter 704 of FIG. 7, in accordance with exemplary embodiments of the invention. For instance, the protection circuit 1205 can correspond to an embodiment of the protection circuit 905 of FIG. 9. Elements common to both protection circuits 1105 and 1205 share common reference indicia, and only differences between the protection circuits 1105 and 1205 are described herein for the sake of brevity. In the illustrated embodiment, the transmit antenna connection $V_A$ (FIG. 8) is selectively coupled to either ground or to the transmit circuitry connection $V_T$. The switch S1 of the power control circuit 1225 is normally closed, whereas the switch S3 is normally open, thereby decoupling the transmit circuitry and the antenna during the off-state and for protection. When the transmit circuit is in an on-state and the detection circuit does not sense a received electromagnetic field, the switch S1 opens and the switch S3 closes, thereby coupling the transmit circuit and the transmit antenna.

Figure 13:
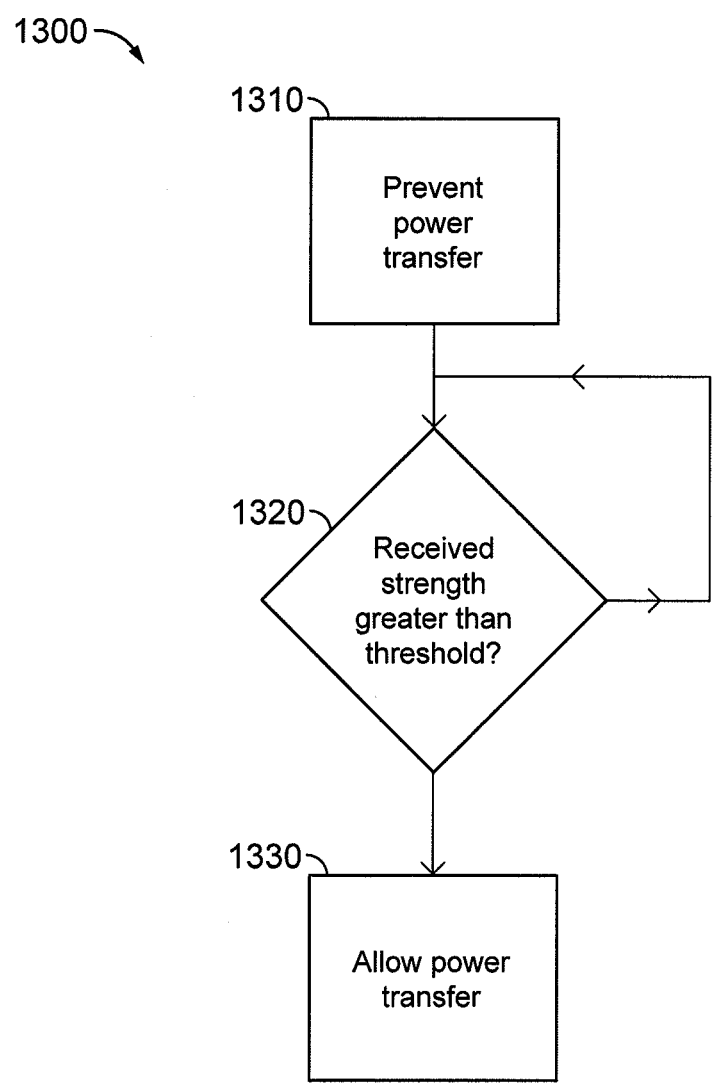
FIG. 13 is a flowchart diagram of a method of protecting a circuit, in accordance with exemplary embodiments of the invention.

FIG. 13 is a flowchart diagram of a method 1300 of protecting a circuit, in accordance with exemplary embodiments of the invention. The circuit is configured to drive an antenna in a transmitter. In the method 1300, at block 1310, power is prevented from being transferred between the circuit and the antenna. At block 1320, a strength of an electromagnetic field received by the antenna is determined to be greater or less than a threshold. If the strength is greater than the threshold, the received power continues to be monitored. Once the strength is less than the threshold, at block 1330 power is allowed to transfer between the circuit and the antenna, and the circuit may drive the antenna.

Figure 14:
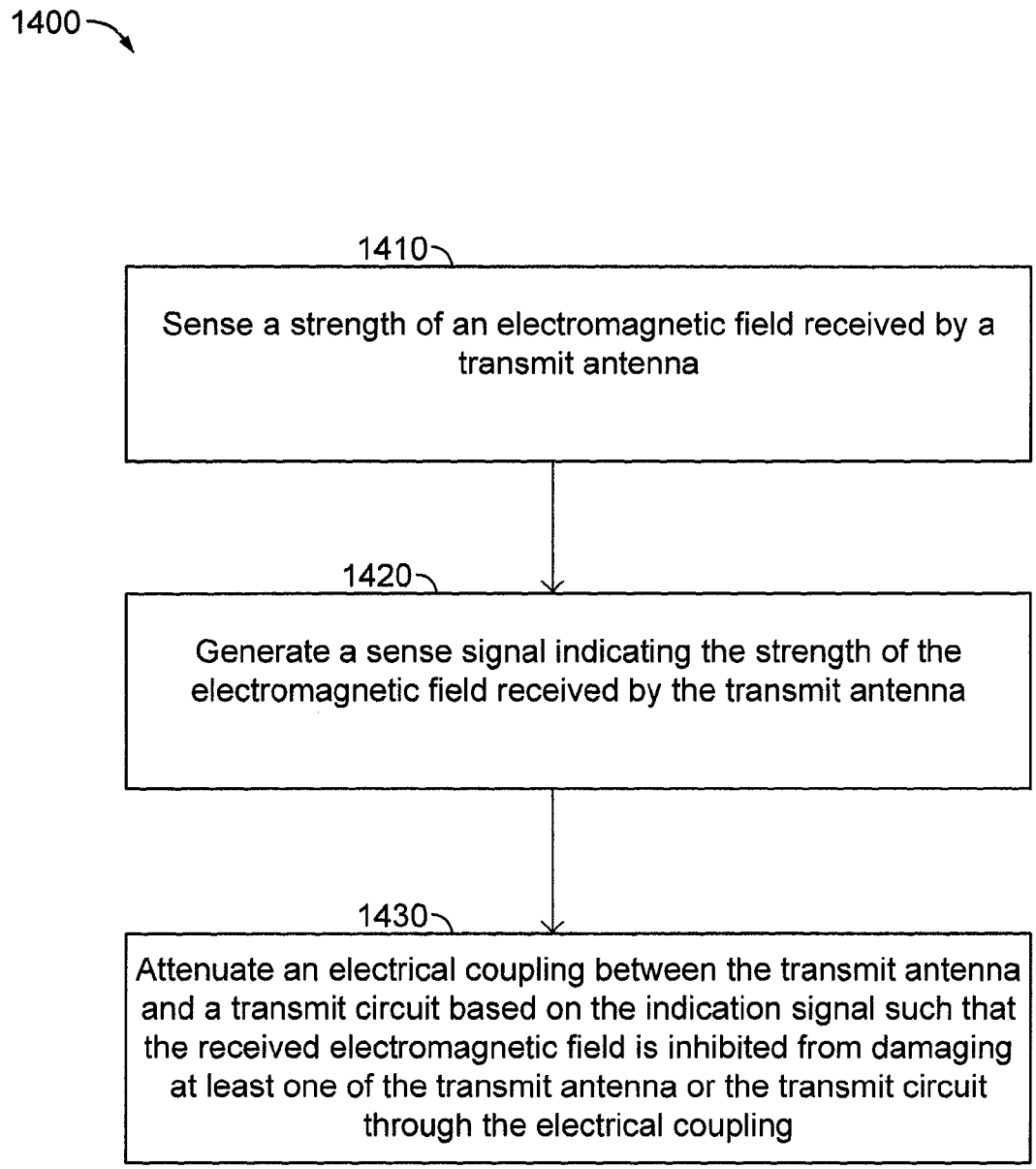
FIG. 14 is a flowchart diagram of a method of protecting a circuit, in accordance with exemplary embodiments of the invention.

FIG. 14 is a flowchart diagram of a method 1400 of protecting a circuit, in accordance with exemplary embodiments of the invention. The method starts at block 1410 for sensing a strength of an electromagnetic field received by a transmit antenna. For example, the detection circuit 1015 or 1115 can be used for sensing a strength of a received electromagnetic field. While sensing, the method 1400 proceeds to block 1420 for generating an indication signal indicating the strength of the electromagnetic field received by the transmit antenna. For example, the detection circuit 1015 or 1115 can be used to generate the sense signal. In one embodiment, the sense signal can be generated by the detection circuit. In various embodiments, the sense signal can be provided to a circuit or to a processor to generate the indication signal. In response to receiving the indication signal, the method 1400 moves to block 1430 for attenuating an electrical coupling between the transmit antenna and a transmit circuit based on the indication signal. By attenuating the coupling the received electromagnetic field is inhibited from damaging at least one of the transmit antenna or the transmit circuit through the electrical coupling. For example, the power control circuits 805, 1025, or 1125 can be used to attenuate the electrical coupling by creating a shunt. In another embodiment, the connection power control circuitry 905 can be used to attenuate the electrical coupling by decoupling a connection.

FIG. 8 is a functional block diagram of a wireless power transmitter protection circuit 805, in accordance with an exemplary embodiment of the invention. Wireless power transmitter protection circuit 805 comprises means 810 and 815 for the various actions discussed with respect to FIGS. 7, 8, 10, and 11.

FIG. 9 is a functional block diagram of a wireless power transmitter protection circuit 905, in accordance with an exemplary embodiment of the invention. Wireless power transmitter protection circuit 905 comprises means 910 and 915 for the various actions discussed with respect to FIGS. 7 and 12.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for wirelessly transmitting power may comprise an antenna, such as antennas 214, 352, 414, and 714 of FIGS. 2, 3, 4, and 7 respectively. Means for generating signals for the power transmitting means may comprise transmit circuitry such as any of transmit circuitry 206, 406, 600, and 706 of FIGS. 2, 4, 6, and 7, respectively. Means for sensing a strength of an electromagnetic field received by a transmit antenna and for generating an indication signal indicating the strength of the electromagnetic field received by the transmit antenna may comprise a detection circuit, such as detection circuits 815, 915, 1015, 1115, and 1215 of FIGS. 8-12, respectively. Means for attenuating an electrical coupling between the transmit antenna and a transmit circuit based on the indication signal such that the received electromagnetic field is inhibited from damaging at least one of the transmit antenna or the transmit circuit through the electrical coupling may comprise a power control circuit, such as power control circuits 810, 910, 1025, 1125, and 1225 FIGS. 8-12, respectively. Means for sensing electromagnetic field and/or power from the antenna and for generating a signal indicating an amount of power received by the antenna may comprise a detection circuit, such as detection circuits 815, 915, 1015, and 1115 of FIGS. 8, 9, 10, and 11, respectively.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmission device, the device comprising:
   a transmit antenna;
   a transmit circuit configured to generate a power transmit signal for powering the transmit antenna to generate a wireless field sufficient for wirelessly charging another device;
   a switch configured to electrically couple the transmit antenna and the transmit circuit;
   a detection circuit configured to sense a strength of an electromagnetic field received by the transmit antenna and further configured to generate a sense signal indicating the strength of the electromagnetic field received by the transmit antenna; and
   a power control circuit configured to receive the sense signal from the detection circuit and control the switch, based at least on the sense signal, to attenuate the electrical coupling between the transmit antenna and the transmit circuit such that the received electromagnetic field is inhibited from damaging at least one of the transmit antenna or the transmit circuit through the electrical coupling.

2. The device of claim 1, wherein the detection circuit is configured to sense the strength of the electromagnetic field received by the transmit antenna by measuring an electrical characteristic generated by the transmit antenna.

3. The device of claim 1, wherein a power control circuit is configured to attenuate the electrical coupling by at least one of opening or closing the switch to electrically isolate the transmit antenna and the transmit circuit based at least partly on the sense signal.

4. The device of claim 1, wherein the power control circuit is configured to selectively control the switch to activate a connection between the transmit antenna and the transmit circuit, wherein the connection is configured to shunt current away from the transmit circuit when activated.

5. The device of claim 1, wherein the power control circuit is configured to control the switch to decouple a connection between the transmit antenna and the transmit circuit.

6. The device of claim 1, wherein the power control circuit is configured to prevent power transfer between the transmit antenna and the transmit circuit based on the power control circuit being in an off-state.

7. The device of claim 1, wherein the power control circuit is configured to allow power transfer between the transmit antenna and the transmit circuit based on the transmit antenna receiving power less than a predetermined threshold.

8. The device of claim 1, wherein the detection circuit is configured to cease sensing the strength of the electromagnetic field received by the transmit antenna based on the transmit antenna receiving less power than a predetermined threshold.

9. The device of claim 1, wherein the power control circuit comprises a relay.

10. The device of claim 1, wherein the detection circuit comprises a sensing element, a rectifier, and a filter.

11. The device of claim 1, further comprising:
a processor operably coupled to the detection circuit and the power control circuit,
wherein the detection circuit is configured to provide the sense signal to the processor,
wherein the processor is configured to generate a control signal based on the sense signal and transmit the control signal to the power control circuit, and
wherein the power control circuit is configured to control the switch based on the control signal.

12. The device of claim 1, further comprising:
a processor operably coupled to the detection circuit and the power control circuit,
wherein the detection circuit is configured to provide the sense signal to the processor,
wherein the processor is configured to generate a control signal based on the sense signal and transmit the control signal to the power control circuit, and
wherein the power control circuit is configured to selectively prevent or allow the transmit circuit to transfer power to the transmit antenna based on the control signal.

13. A method of protecting a wireless power transmission device, the method comprising:
generating, by a transmit circuit, a power transmit signal for powering a transmit antenna to generate a wireless field sufficient for wirelessly charging a device;
sensing a strength of an electromagnetic field received by the transmit antenna;
generating a sense signal indicating the strength of the electromagnetic field received by the transmit antenna; and
attenuating an electrical coupling between the transmit antenna and a transmit circuit, via a switch coupled between the transmit antenna and the transmit circuit, based at least on the sense signal, such that the received electromagnetic field is inhibited from damaging at least one of the transmit antenna or the transmit circuit through the electrical coupling.

14. The method of claim 13, wherein the sensing includes measuring an electrical characteristic generated by the transmit antenna to determine the strength of the received electromagnetic field.

15. The method of claim 13, wherein the attenuating the electrical coupling includes controlling the switch to activate an electrical pathway between the transmit antenna and the transmit circuit, wherein the electrical pathway is configured to shunt current away from the transmit circuit when activated.

16. The method of claim 13, wherein the attenuating the electrical coupling includes controlling the switch to decouple the electrical coupling between the transmit antenna and the transmit circuit.

17. A wireless power transmission apparatus, the apparatus comprising:
first means for generating a wireless field sufficient for wirelessly charging another device;
second means for generating a power transmit signal for powering the first generating means;
means for electrically coupling the first and second generating means;
means for sensing a strength of an electromagnetic field received by the first generating means;
third means for generating a sense signal indicating the strength of the electromagnetic field received by the first generating means; and
means for attenuating the electrical coupling between the first and second generating means, based at least on the sense signal, such that the received electromagnetic field is inhibited from damaging at least one of the first or second generating means through the electrical coupling.

18. The apparatus of claim 17, wherein the sensing means is configured to sense an electrical characteristic generated by the first generating means to determine the strength of the received electromagnetic field.

19. The apparatus of claim 17, wherein the attenuating means is configured to control the electrical coupling means to activate an electrical pathway between the first and second generating means, wherein the electrical pathway is configured to shunt current away from the second generating means when activated.

20. The apparatus of claim 17, wherein the means attenuating means is configured to control the electrical coupling means to decouple the electrical coupling between the first and second generating means.

* * * * *